W. L. MARDEN.
WATER METER.
APPLICATION FILED SEPT. 28, 1920.
1,400,559.
Patented Dec. 20, 1921.
Fig. 1.
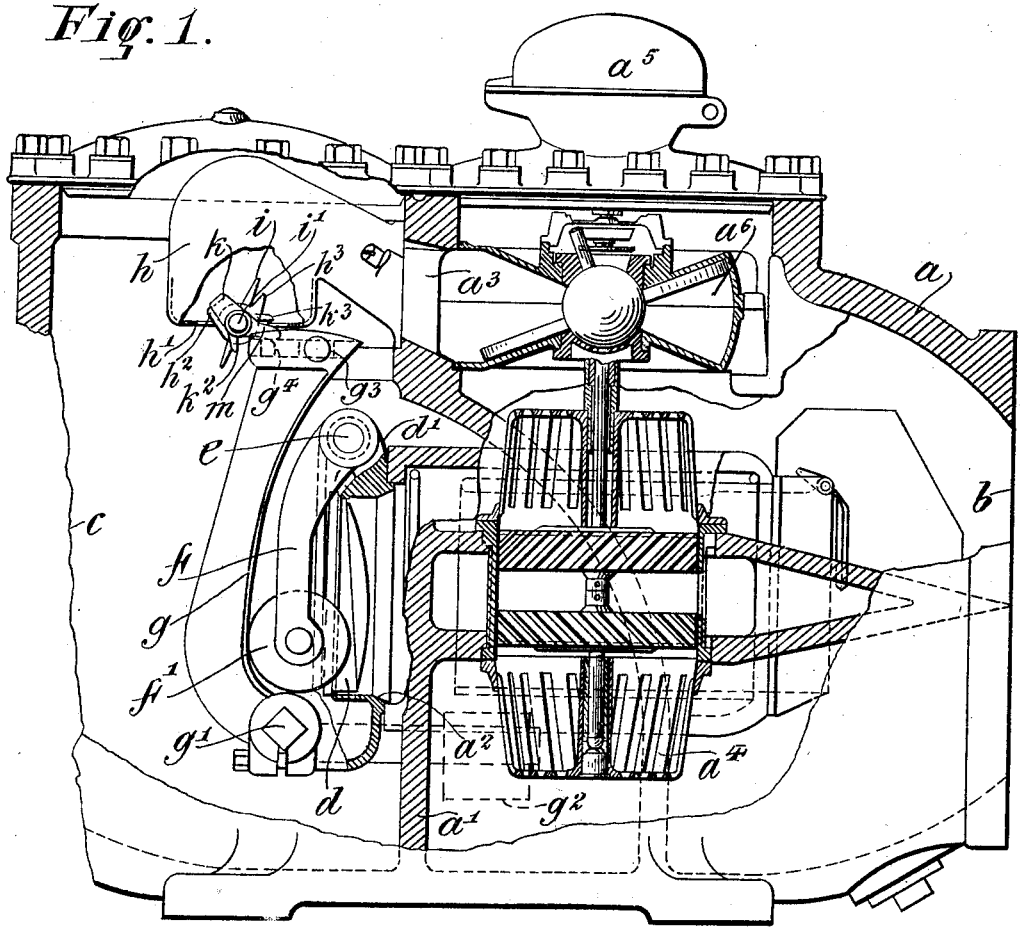
Fig. 3.
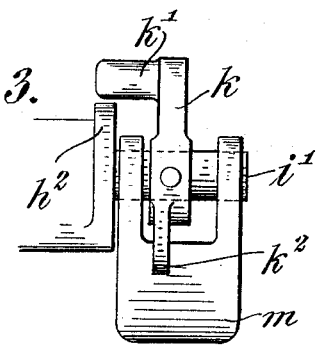
Fig. 2.
INVENTOR
William L. Marden
BY
Redding & Greeley
ATTORNEYS

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

WATER-METER.

1,400,559.  Specification of Letters Patent.  Patented Dec. 20, 1921.

Application filed September 28, 1920. Serial No. 413,303.

*To all whom it may concern:*

Be it known that I, WILLIAM L. MARDEN, a citizen of the United States, residing in the borough of Manhattan of the city of New York, in the State of New York, have invented certain new and useful Improvements in Water-Meters, of which the following is a specification, reference being had to the accompanying drawings, forming a part hereof.

This invention relates to water meters of the general character of that shown in Letters Patent of the United States No. 1,142,141, dated June 8, 1915, in which there is provided a metering device for low-duty flow and a proportional metering device for high-duty flow, the high-duty passage and the low-duty passage being controlled by valves, the one of which closes as the other opens, and vice versa. It has been found, in the operation of the meter shown in the Letters Patent referred to, that under some conditions, either by accident or by intentional manipulation, the valve of the low-duty passage may sometimes fail to close, so that the meter, as an entirety, will not function as intended. It is the object of the present invention to improve the construction of the valve of the low-duty passage so that it shall close with certainty under all conditions and cannot be manipulated or affected by accident so as to prevent its proper closing, while at the same time the construction is simplified as compared with that shown, for example, in the Letters Patent above mentioned. The invention will be more fully explained hereinafter with reference to the accompanying drawing in which it is illustrated and in which—

Figure 1 is a view in vertical section of a meter of the character referred to with which the present invention is incorporated.

Figs. 2 and 3 are detail views on a somewhat larger scale showing parts to be referred to.

The meter casing $a$ is shown as provided with the usual inlet $b$ and outlet $c$ and a transverse partition $a'$ therein which is formed as usual with a high-duty orifice $a^2$ and a low-duty orifice $a^3$. The high-duty metering devices, which may be of the proportional type, are indicated generally at $a^4$ and as connected with suitable registering mechanism, indicated at $a^5$. The low-duty metering device, indicated generally at $a^6$, may comprise a positive metering device, such as a disk meter and is connected to suitable registering mechanism not shown.

The high-duty orifice $a^2$ is closed, during low-duty service, by a valve $d$ which may be suspended from a supporting arm $d'$ pivotally carried by a shaft $e$. Fixed to the shaft $e$ is a depending arm $f$ having a roller $f'$ arranged to run along the face of a cam arm $g$ which is fixed to a supporting shaft $g'$, to which is also secured a counter weight $g^2$.

The low-duty passage $a^3$ terminates in a casing $h$, the floor of which is substantially flat and is provided with an opening $h'$ controlled by a butterfly valve $i$ rotatably mounted on a shaft $i'$ and itself unsymmetrical, as clearly shown in Fig. 2. The shaft $i'$ of the valve is extended beyond the casing $h$ and has secured on its projected end an arm $k$ provided with a lug $k'$ to play between two fixed stops $h^2$ and $h^3$ secured to or formed with the casing $h$. On the other side of the axis the arm $k$ is forked to form two separate fingers $k^2$ and $k^3$. Hung loosely on the projected end of the shaft $i'$ and between the fingers $k^2$ and $k^3$, is a dog $m$ which is adapted to coöperate with the upper end of the arm $g$. The latter has a pin or roller $g^3$ and a bar or shoulder $g^4$ to coöperate respectively with the dog $m$, the pin or roller $g^3$ and the bar or shoulder $g^4$ being separated by a space which may receive the dog freely.

Normally the pressure of the water in the low-duty passage, acting on the unsymmetrical valve $i$, closes the valve and holds it closed but when the high-duty valve $d$ is closed and the arm $g$ in corresponding position, the bar or shoulder $g^4$ at the upper end of the arm $g$ acts upon the dog $m$ and, through the forked arm $k$ on the shaft $i'$, holds the valve $i$ in open position, the movement of the valve in either direction being limited by coöperation of the fixed stops $h^2$ and $h^3$ with the lug $k'$ of the arm $k$. When, however, the high-duty valve $d$ is moved from its seat by the differential of pressure under high service conditions, the arm $g$ is thrown forward and the dog $m$ drops into the space between the pin $g^3$ and the shoulder $g^4$ and, in the continued forward movement of the arm $g$, the shaft $i'$ is rocked and the valve $i$ is rotated to closed position. The dog, being loosely mounted, permits the pin $g^3$ of the arm $g$ to move beyond it, in the continued movement of the arm $g$. When the high-duty flow ceases and the valve $d$ and arm $g$ return to low-duty positions the pin $g^3$, acting on the loose dog $m$, rocks the shaft $i'$ and eventually the bar $g^4$ holds the dog in such position as to maintain the valve $i$ in its opened position. It is obvious that the valve $i$ cannot be moved, either by accident or manipulation, to a position in which it becomes inoperative, that the rotary valve will be closed by the pressure of the water in the low-duty passage whenever the high-duty passage is open and the low-duty valve is free, and that the low-duty valve will be held open positively when the high-duty passage is open.

I claim as my invention:

1. A meter comprising a casing having a high-duty passage, a high-duty valve to control the same, a low-duty passage, a butterfly valve to control the low-duty passage pivoted upon an axis which is unsymmetrically placed with respect to the exposed area of the valve, with the larger area opposed to the pressure of the liquid, whereby the valve is maintained normally closed, means to prevent the opening of the valve by the pressure of the liquid, and means actuated by the movement of the high-duty valve in one direction to open the low-duty valve.

2. A meter comprising a casing having a high-duty passage, a high-duty valve to control the same, a low-duty passage, a butterfly valve to control the low-duty passage pivoted upon an axis which is unsymmetrically placed with respect to the exposed area of the valve, with the larger area opposed to the pressure of the liquid, whereby the valve is maintained normally closed, means to prevent the opening of the valve by the pressure of the liquid, and means actuated by the opening movement of the high-duty valve to close the low-duty valve and in the closing movement of the high-duty valve to open the low-duty valve.

3. A meter comprising a casing having a passage therethrough, a butterfly valve mounted in the passage and having an extended shaft, a fork secured to said shaft, a freely swinging dog to coöperate with the arms of the fork, and means to move the dog in one direction and in the other.

4. A meter comprising a casing having a passage therethrough, a butterfly valve mounted in the passage and having an extended shaft, a fork secured to said shaft, a freely swinging dog to coöperate with the arms of the fork, means to move the dog in one direction and in the other, and means to limit the movement of the butterfly valve in each direction.

5. A meter comprising a casing having a high-duty passage, a high-duty valve to control the same, a low-duty passage, a butterfly valve to control the low-duty passage and having an extended shaft, a fork secured to said shaft, a freely swinging dog to coöperate with the arms of the fork, and means actuated by the closing movement of the high-duty valve to act upon the dog to open the butterfly valve.

6. A meter comprising a casing having a high-duty passage, a high-duty valve to control the same, a low-duty passage, a butterfly valve to control the low-duty passage and having an extended shaft, a fork secured to said shaft, a freely swinging dog to coöperate with the arms of the fork, and means actuated by the opening movement of the high-duty valve to act upon the dog to close the low-duty valve and in the closing movement of the high-duty valve to act upon the dog to open the low-duty valve.

This specification signed this 26 day of August, A. D. 1920.

WILLIAM L. MARDEN.